Figure 3:
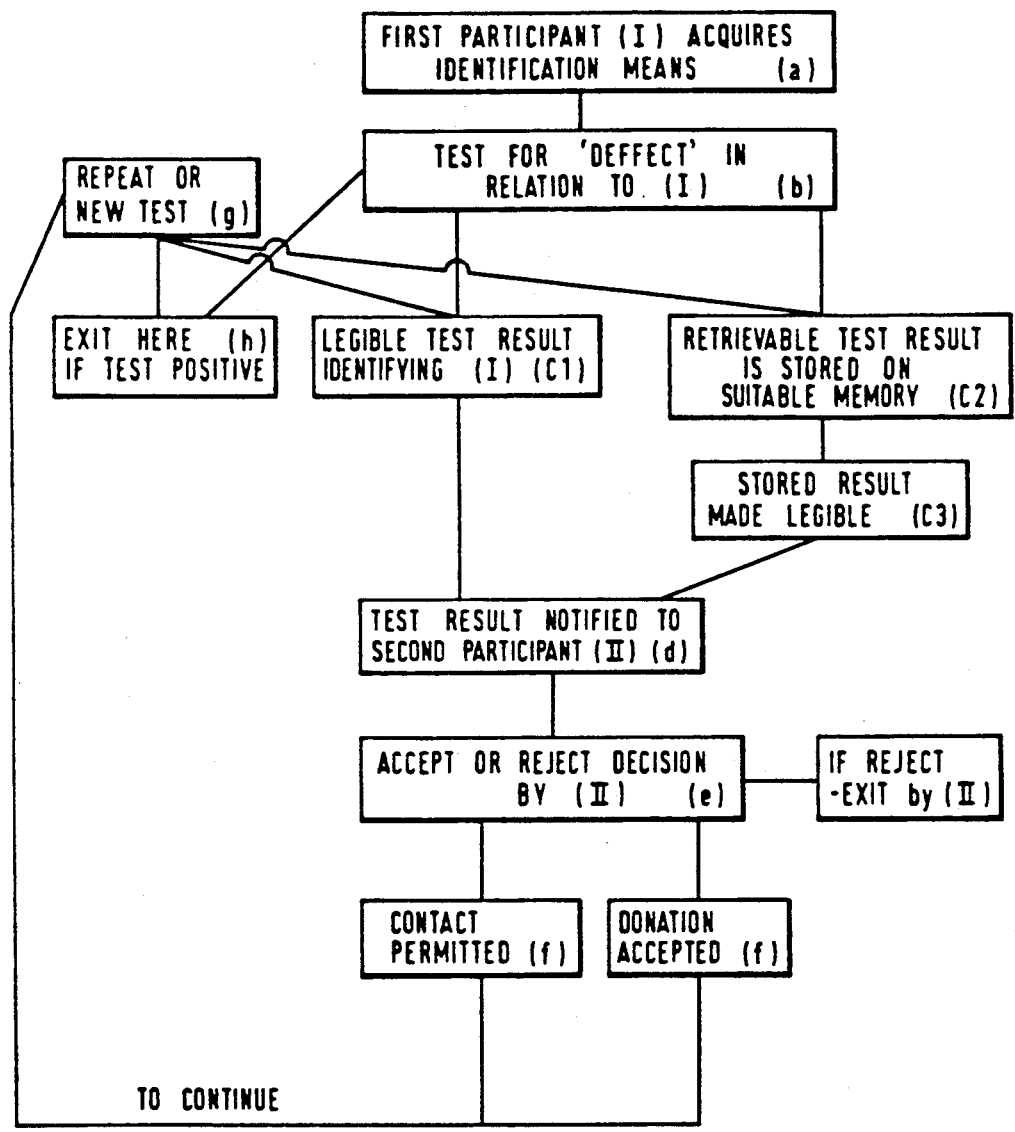

United States Patent [19]

Nassim

[11] Patent Number: 5,108,131
[45] Date of Patent: Apr. 28, 1992

[54] METHOD OF CONTROLLING TRANSMISSION OF DEFECTS

[75] Inventor: Labib A. Nassim, Paris, France

[73] Assignee: Mainframe Data Limited, Paris, France

[21] Appl. No.: 252,280

[22] PCT Filed: Oct. 5, 1987

[86] PCT No.: PCT/GB87/00702
§ 371 Date: Sep. 22, 1988
§ 102(e) Date: Sep. 22, 1988

[87] PCT Pub. No.: WO88/02700
PCT Pub. Date: Apr. 21, 1988

[30] Foreign Application Priority Data

Oct. 7, 1986 [GB] United Kingdom ............... 8624013
Nov. 27, 1986 [GB] United Kingdom ............... 8628345

[51] Int. Cl.[5] .............................................. B42D 15/00
[52] U.S. Cl. ..................................... 283/70; 283/117; 283/116
[58] Field of Search ................... 40/640; 283/70, 76, 283/904, 900, 116, 117

[56] References Cited

U.S. PATENT DOCUMENTS

| | | | |
|---|---|---|---|
| 3,502,437 | 3/1970 | Mass | 422/61 |
| 3,921,318 | 11/1975 | Calavetta | 40/626 |
| 4,122,947 | 10/1978 | Falla | 40/640 |
| 4,236,332 | 12/1980 | Domo | 283/76 |
| 4,259,391 | 3/1981 | Brecht | 428/195 |
| 4,459,015 | 7/1984 | Brecht | 355/46 |
| 4,632,428 | 12/1986 | Brown | 283/76 |

FOREIGN PATENT DOCUMENTS

| | | |
|---|---|---|
| 2167252 | 7/1973 | France . |
| 2229099 | 4/1974 | France . |
| 2092952A | 8/1982 | United Kingdom . |

Primary Examiner—Paul A. Bell
Attorney, Agent, or Firm—Lowe, Price, LeBlanc & Becker

[57] ABSTRACT

Apparatus useful in preventing or reducing risks of transmitting an infectious disease, primarily AIDS, or genetic disorder, comprises identification means such as a personal card bearing identity particulars of a first participant and security feature(s) and a storage medium such as a certificate or data based, bearing legible or retreivable test result data concerning the particular defect. A second participant consults the result before permitting intimate contact or accepting a donation of blood, body tissue or similar material.

9 Claims, 3 Drawing Sheets

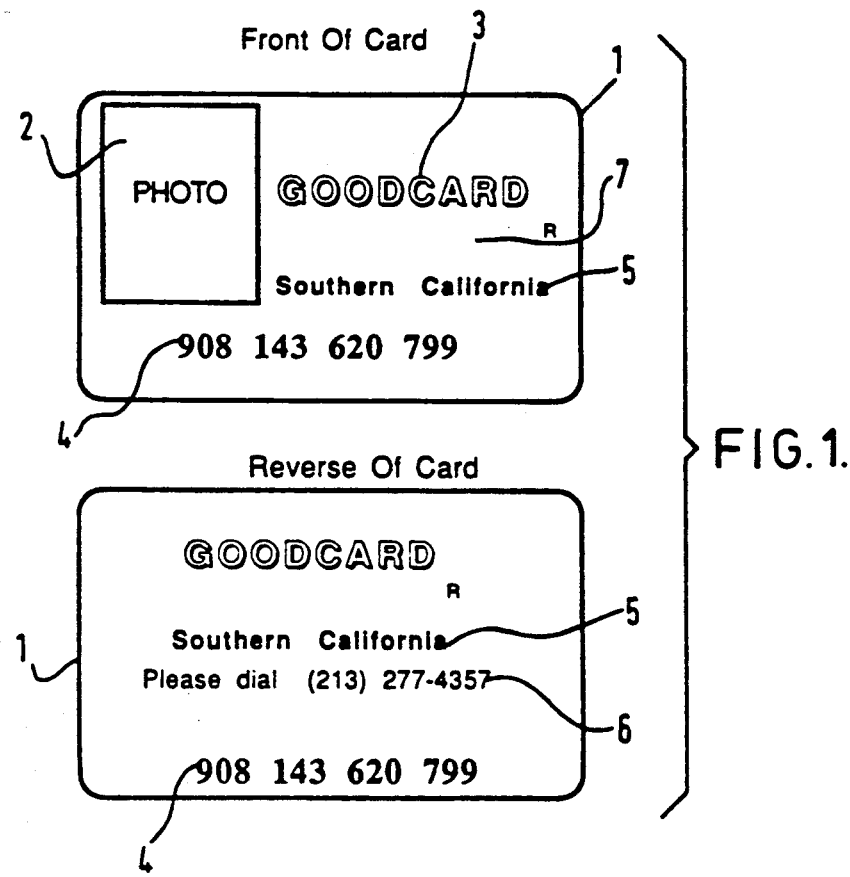
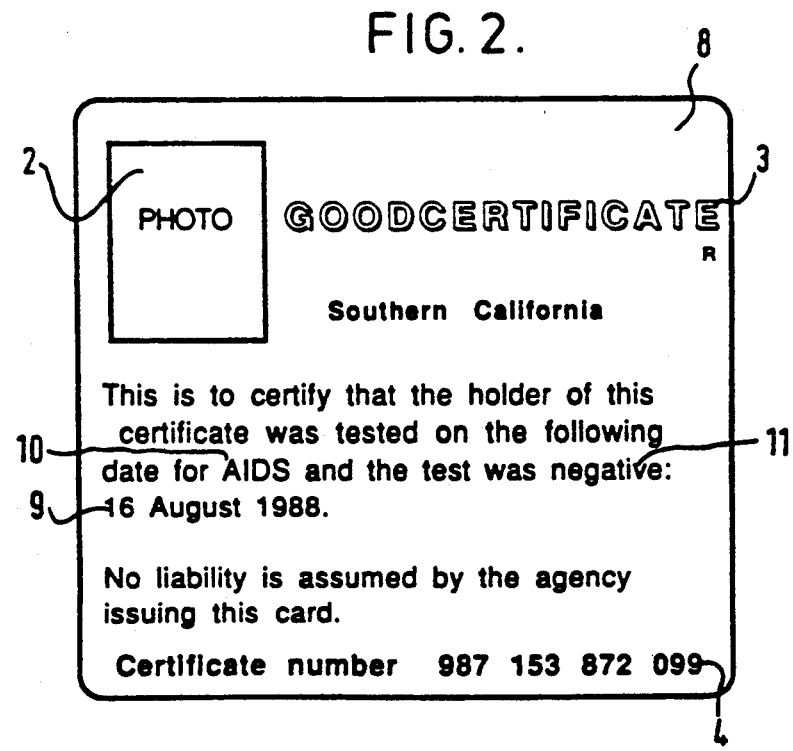

METHOD OF CONTROLLING TRANSMISSION OF DEFECTS

This invention is concerned with methods of preventing or reducing the risks of transmission of defects from one participant to another, e.g. from one human being to another human being or to an organisation. More particularly it is concerned with such methods of preventing, or substantially reducing the risk of transmission of a communicable disease or disorder. By communicable disease or disorder we include, for example infectious ailments be they viral, bacterial or the like and genetically transmissible disorders.

The invention may find application amongst humans who are contemplating intimate contact or contemplating donation of body fluids or material for reception or use by a second participant. The invention may also be useful to persons or organisations responsible for such donations as blood banks, hospitals, transfusion centers, medical teams and the like. The invention could even be useful in the field of animal husbandry as a means of controlling undesirable disease or disorder under human supervised breeding conditions.

Use of the invention may be a systematic control method to help stop the spread of communicable disease or disorder in which medical treatment is not required. As will become apparent, the invention has a principal application in stemming further spread of sexually communicable diseases amongst humans, notably Acquired Immune Deficiency Syndrome (AIDS) for which there is currently no cure and to a lesser extent, the venereal diseases such as syphilis, gonorrhea or herpes. The invention may also find application in preventing, or substantially reducing the risks of transmission of a genetic disorder from one generation to another e.g. to an offspring of a participant. In this field of hereditary defects the invention may be useful in controlling such communicable defects as, for example, mongolism, cystic fibrosis, haemophilia, diabetes and sickle cell amaemia.

The following terms and expressions are used throughout the description and claims to include the following:

"First Participant": an individual contemplating intimate contact with or donation to a second participant; or a first animal for breeding or donation purposes.

"Defect": communicable disease or disorder being infectious or genetic which may adversely affect the health or function of an individual or animal. The term is used to include any sexually communicable disease amongst living beings, especially AIDS.

"Second Participant": an individual contemplating intimate contact with a user, a second animal for breeding or donation-receiving purposes or an individual, group, team, organisation and the like which receives or monitors donated body fluid or material, or contemplates such receipt.

As examples of body fluid or material that may be donated we include human or animal blood that can be used either immediately or subsequently for transfusion, for conversion into blood products such as separation into blood plasma, or concentration and separation in factor VIII, and e.g. bone marrow for immediate or subsequent transplantation. We also include organs for transplantation, for example, one kidney from an individual (first participant) to a related individual (second participant) when both such individuals are live or posthumous donation of vital organs such as kidneys, heart, lungs in the event of an untimely death of first participant. Individuals wishing to donate any such organs may carry a donor card expressing a wish or preference for a donation or, alternatively, the decision to donate may be made by representatives of the donor, for example, the parents (as second participants in a monitoring function) of an individual recently killed. Before a medical team may wish to use any donated organs they may require up-to-date information in respect of potentially damaging defects such as contamination by the AIDS virus or subject to haemophilia genetic disorder and the like.

As a suitable body fluid which may be donated by individuals or animals we also include semen which may be stored in a sperm bank and used for artificial insemination. It may be advantageous for the recipient (second participant) of such semen to have up to date information in respect of any required defect by having access to a test result in respect of that defect for such donated material.

The invention is useful in preventing transmission of disease or disorder from a potential carrier, which may be anyone or any animal within a given population, to a potential recipient of that disease or disorder. The invention may therefore be useful to people concerned with animal husbandry but principally to individuals as first and second participants contemplating intimate contact where there exists a risk of acquiring an infectious disease. As will become apparent this can be provided by independent test result for assessment by a second participant.

In many countries there is considerable anxiety over the spread of the communicable disease known as AIDS. Three possible methods of controlling the spread include find a cure, find a vaccine or separate the AIDS infected carriers from intimate or other risky contact with the rest of the population. The first two solutions are currently considered to be unobtainable in the immediate future. The separation proposal has been the only practicable step at the present time.

The importance of controlling further spread of AIDS into the non-AIDS infected population is becoming more and more important in the United Kingdom and is already a problem in countries such as the United States where many persons are AIDS infected.

The majority of organised attempts to isolate carriers of the AIDS human immunodeficiency virus HIV from the contact with the remaining population have been directed at isolating the sick from the healthy, i.e. those infected from those who are not. The AIDS virus has a long incubation period and for this reason any control measures are likely to affect the sensitive issue of personal liberty. The present invention is based on a surprisingly different approach to the problem in that it is concerned with isolating the healthy from the sick rather than the converse. Any attempts by individuals to isolate themselves from potential or actual carriers of AIDS have been haphazard. It has been observed that individuals at risk of contacting AIDS have limited the number of intimate contacts made with others.

Use of the present invention permits a still further and significant reduction of risks and therefore may save lives and reduce anxiety and stress amongst individuals who use the apparatus and/or method according to the invention.

According to this invention there is provided a method of controlling transmission of a defect from a first participants to a second participants comprising:

(a) supplying the first participant with identification means, (b) performing a test for presence or absence of the defect upon or in relation to the first participant, (c1) producing in legible or retrievable form a test result in a storage medium identifying the first participant or (c2) storing the test result in a database followed by (c3) retrieval of that result, (d) informing the second participant of the test result, (e) establishing an accept or reject decision by or on behalf of the second participant, and (f) permitting contact between first and second participant or donation from first to second participant if step (e) results in a decision to accept.

Optionally the first participant may repeat that test or have a different test for another communicable disease or disorder performed at any stage after (a). Furthermore, the first participant may decide to terminate the sequence before step (d) if the particular test is unfavorable, e.g. after a diagnosis of AIDS antibody positive.

In step (c1) of the method the result may be stored legibly on an independently issued certificate and this proof of result may be presented to or sent to the individual (first participant) immediately upon completion of the test. The individual will then be at liberty to disclose this to any second participant of his choosing. Alternatively, the test result may be stored on or in electronic, optical or magnetic storage medium such as a database and subsequently retrieved by the second participant with express or implicit permission from the first participant. This may be achieved by the second participant interrogating the appropriate storage medium to retrieve the result and possibly have a permanent record of it by certificate, print out or the like. This may be done in the presence of the first participant or by furnishing consent to a data center operator who stores a plurality of test results on a specific database. A second participant may be given a secret access code from the first participant to retrieve the test result from the storage medium (e.g. database) without the intermediary of an operator.

Such interrogation of a database may produce a result by audio and/or visual means such as, for example, a printed record being obtained at the request of the recipient.

It may be convenient for the identification means to comprise a personal identity card similar to plastic credit cards in common use. The identity information may include a photograph, a name, a legible code and-/or a secret code. Examples of security features include predetermined patterns and/or holograms. The storage medium may simply comprise paper such as a certificate bearing a legible test result giving date, type and result of test, plus information identifying the first participant. Alternatively the storage medium may be electronic, optical or magnetic, in which case the test result would be retrievable and then could be made permanently legible if desired.

In one embodiment the identification means is a personal card bearing a magnetic strip having the test result stored on it. The result can be retrieved subsequently.

One convenient test for a first participant is carried out on a blood sample, e.g. the test for AIDS antibodies. The present apparatus and method is especially useful in controlling the further spread of sexually transmissible disease or disorder.

Figure 4:
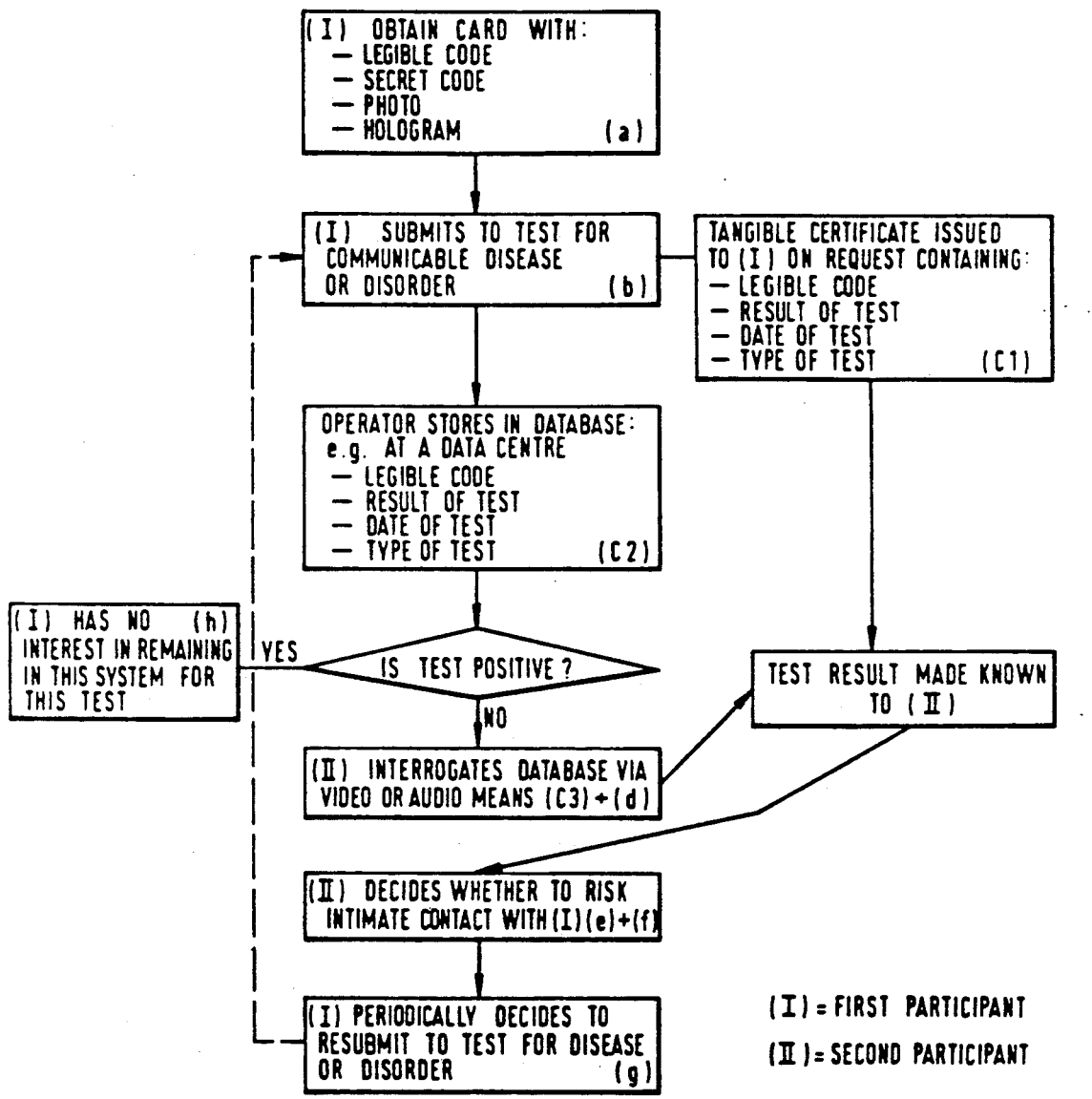

The present apparatus can be used in conjunction with means for retrieving a non-legible test result carried on the storage medium. For example an electronic decoder and display unit optionally with printing means. In order that the invention may be illustrated and readily carried into effect, embodiments thereof will now be described by way of example only with reference to the accompanying drawings, in which:

FIG. 1 includes illustrations of a front and reverse sides of an identification means preferably used with the present invention, FIG. 2 is a diagram of a storage medium carrying legible test result, and FIGS. 3 and 4 are flow charts of methods that may be carried out using the apparatus features. FIGS. 1 and 2 relate to structures to be used immediately prior to contemplated or to proposed intimate contact between a first participant and a second individual participant. It may equally apply with some modifications where intimate contact is proposed between animals, under human-supervised breeding conditions or for establishing the suitability of donated body fluid or material for subsequent transfusion or other use. All participants may subscribe to a defect screening system in which a data center, controlled by an operator, stores test results on a database and permits retrieval of results under authorised terms.

The first participant is provided with a card similar to a credit card 1. The card has a legible code 4, a secrete code 7 (invisible), a photograph 2 of the holder, and a hologram (not shown). It should be noted that the name and signature of the user are unnecessary. The card also has a logo 3, an address 5 and telephone number 6 of a data center which stores the test results.

The first participant has his blood tested at least once, preferably periodically, at a suitable location e.g. one approved by the above noted screening system operator. The data center would verify the authenticity of the card and note the legible code. The result of the test, the type of test, the date of the test and the code on the card would be sent to the operator if it is to be stored on a database for subsequent retrieval. This information could even be applied to a magnetic electronic or optical recording strip on one side of the card (not shown).

Instead of storage the test result can be compiled as a certificate, see FIG. 2, which shows a tangible certificate 8 having optional logo 3, photograph 2 of first participant, security feature 4, date of test 9, type of test 10 and result of test 11. This certificate can be retained by the first participant.

At any time that the first participant may wish to establish absence of a defect to a second participant he may interrogate this database in the presence of that second participant or otherwise expressly consent to interrogation in his absence. The secrete code may be used to give right of access to this database. An alternative way of presenting this data after retrieval would be for a data center operator to produce on demand, a certificate explaining the test results of the first participant. At any time desired the first participant may show this certificate of independent test to a second participant to establish absence of defect. At that time a more informed decision to permit intimate contact or accept donation can be made thus helping control of the particular disease of disorder tested.

It should be the responsibility of the second participant to interpret test results to determine whether intimate contact or receipt/use of donation can be permitted.

Plastic cards are only one of many possible identification means to establish a link between a first participant, the test result, the second participant and the storage means, e.g. database.

Operators may wish to communicate anonymous data across regions and countries in order to improve the method and freedom of first participants.

Many feasible ways exist for presenting test result data in such a way as to enhance the ease of use while preventing fraud. For example, by telephone, by videotex, by certificate and the like.

Participants using the apparatus and method may therefore make substantial contributions to controlling the spread of communicable disease or disorder and consequently enhancing the health and well being of the human or animal population.

For a general application of the method which illustrates the use of the apparatus the reader is referred to FIG. 3 whilst for a more specific example, based on the FIGS. 1 and 2 apparatus the reader is referred to FIG. 4. The flowcharts themselves are self-explanatory with an index given relating to each particular step in the method as defined above.

The invention can be seen to involve testing of living beings or live organs or useful body fluid/material for certain physical parameters and a secure system of passing information to individuals or groups etc. at the choice of the first participant.

Testing for presence or absence of defects is meant to include all means and methods for performing such tests, for example by testing samples of blood, urine, skin, flesh, organs, semen, breath, hair or nails. In some cases certain tests may not require removal of a sample but these may be performed in situ.

An important application of the present invention is in the screening of blood donations by blood banks acting as second participants. Present arrangements for screening are not altogether satisfactory and in certain countries blood is donated for financial reward. In such a situation the donors (first participants) can be infected by a communicable disease such as AIDS or hepatitis virus but the blood bank unknowingly accepts their donation and payment is made. It is only after payment that such blood is tested and sometimes destroyed because of the presence of a potentially harmful defect.

By using the present apparatus or method these unnecessary expenses and risks may be circumvented, particularly if the test results are securely stored on a database and access thereto is carefully controlled.

The data center, if used, may pair or twin participants by e.g. supplying both participants' identity card numbers to the operator. When such links are present in the data center all such participants may be notified who could have become infected by e.g. AIDS virus through contact with other participants. When the participant interrogates their own data, they may receive a warning to have medical attention and/or exercise caution in future intimate contacts or donations.

I claim:

1. A method of enabling a reduction in the transmission of a defect in the nature of a communicable disease or a disorder from a first participant to a second participant, the defect being transmittable by a contemplated transfer of body fluid from the first participant to the second participant, comprising the steps of:
   (a) supplying a first person having control over the first participant with an identification means,
   (b) testing the first participant for the defect and deriving a first indication of the test result,
   (c) storing the first indication resulting from the test of step (b) with a second indication of the identity of the first participant, the second indication being stored on the identification means supplied in step (a),
   (d) reading the stored first indication for the test on the first participant immediately prior to a contemplated transfer of the body fluid from the first participant to the second participant,
   (e) supplying a second person having control over the second participant with the identification means supplied in step (a) and with the stored first indication read during step (d) immediately prior to the contemplated transfer of the body fluid from the first participant to the second participant, to enable the second person to make a decision as to whether the second participant is to engage in an activity with the first participant which will result in a transfer of the body fluid from the first participant to the second participant.

2. The method of claim 1 further including storing the first and second indications on a portable identification medium for the results of the test for the first participant and the identity of the first participant, said portable identification medium having said identification means; supplying said portable identification medium with the stored first and second indications to the first person, said portable medium being carried by the first person, the first person supplying the portable medium with the first and second indications thereon to the second person in step (e), step (d) being performed with the first and second indications on the medium.

3. The method of claim 2 wherein the portable identification medium is a personal card including a machine readable storage medium having the test results of step (b) stored therein during step (c), step (d) being performed by reading the first and second indications stored during step (c) with a machine reader.

4. The method of claim 1 further including transferring the body fluid from the first participant to the second participant as a result of the decision made by the second person being that the first participant is free of the defect, as indicated by the test of step (b) on the first participant.

5. A method of enabling a reduction in the transmission of a defect in the nature of a communicable disease or a disorder from a first participant to a second participant, the defect being transmittable by a contemplated transfer of body fluid from the first participant to the second participant, comprising the steps of:
   (a) supplying a first person having control over the first participant with an identification means,
   (b) testing the first participant for the defect and deriving a first indication of the test result,
   (c) storing the first indication resulting from the test of step (b) in a data base at a data center and a second indication of the identity of the first participant on the identification means supplied in step (a),
   (d) reading the stored first indication for the test on the first participant from the data base at the data center immediately prior to a contemplated transfer of the body fluid from the first participant to the second participant,
   (e) supplying a second person having control over the second participant with the identification means supplied in step (a) and with the stored first indication read during step (d) immediately prior to the contemplated transfer of the body fluid from the first participant to the second participant, to enable the second person to make a decision as to whether the second participant is to engage in an activity with the first participant which will result in a transfer of the body fluid from the first participant to the second participant.

(f) communicating the data read at the data center to the second person via an electromagnetic communication link.

6. The method of claim 5 wherein plural tests are performed from time to time for the defect on the first participant, the results of the most recent test being stored as the first indication in the data base at the data center.

7. The method of claim 6 further including the steps of providing the first person with a portable card having thereon a secrete machine readable code with coded indicia providing a right of access to the data base, step (d) being performed in response to the coded indicia on the portable card being read by a machine to derive a signal, and transmitting the thus derived signal to the data center via an electromagnetic link, and accessing the data base at the data center in response to the thus derived signal as transmitted to the data center.

8. The method of claim 6 further including transferring the body fluid from the first participant to the second participant as a result of the decision made by the second person being that the first participant is free of the defect, as indicated by the test of step (b) on the first participant.

9. The method of claim 6 wherein plural tests are performed from time to time for the defect on the first participant, the results of the most recent test being stored as the first indication in the data base at the data center.

* * * * *